US009812981B2

(12) United States Patent
Ritchey et al.

(10) Patent No.: US 9,812,981 B2
(45) Date of Patent: Nov. 7, 2017

(54) VARIABLE COIL CONFIGURATION SYSTEM, APPARATUS AND METHOD

(71) Applicant: EXRO TECHNOLOGIES INC., West Vancouver (CA)

(72) Inventors: Jonathan Gale Ritchey, Vernon (CA); Mitchell Gordon Burton, Vancouver (CA); Ryan Biffard, Calgary (CA)

(73) Assignee: Exro Technologies Inc., West Vancouver (CA)

( * ) Notice: Subject to any disclaimer, the term of this patent is extended or adjusted under 35 U.S.C. 154(b) by 118 days.

(21) Appl. No.: 14/295,069

(22) Filed: Jun. 3, 2014

(65) Prior Publication Data

US 2014/0347903 A1   Nov. 27, 2014

Related U.S. Application Data

(63) Continuation of application No. 13/393,749, filed as application No. PCT/US2010/047750 on Sep. 2, 2010, now abandoned.
(Continued)

(51) Int. Cl.
*H02M 7/06* (2006.01)
*H02P 29/032* (2016.01)
(Continued)

(52) U.S. Cl.
CPC ............... *H02M 7/06* (2013.01); *H02P 9/02* (2013.01); *H02P 25/18* (2013.01); *H02P 25/188* (2013.01); *H02P 29/032* (2016.02)

(58) Field of Classification Search
CPC .............................. H04W 24/10; H04W 88/02
(Continued)

(56) References Cited

U.S. PATENT DOCUMENTS 3,593,112 A * 7/1971 Coats ...................... G05F 1/445
                                                          323/326
3,663,828 A * 5/1972 Low .......................... H02J 3/38
                                                          307/103
(Continued)

FOREIGN PATENT DOCUMENTS

CN        101582672 A      11/2009
DE        197 33 208 C1    10/1998
(Continued)

OTHER PUBLICATIONS

International Preliminary Report on Patentability, dated May 24, 2011, for PCT/US2010/047750, 5 pages.
(Continued)

*Primary Examiner* — Eduardo Colon Santana
*Assistant Examiner* — Devon Joseph
(74) *Attorney, Agent, or Firm* — Seed IP Law Group LLP

(57) ABSTRACT

One or more variable configuration controller (VCC) systems may produce various combinations of series or parallel couplings of coils, winding or inductive elements of an electric machine such as a generator and/or electric motor. The VCC systems include a plurality of bridge rectifiers, and a first number of switches operated to selectively couple respective pairs of coils in series from parallel on an AC side of the bridge rectifiers. The bridge rectifiers provide for automatic electrical isolation of coils on occurrence of open circuit, low voltage or short circuit conditions. A second number of switches with different performance characteristics (e.g., speed, loss) than the first number of switches may be coupled in parallel with respective ones of the first number of switches. Power factor correction may be used.

22 Claims, 14 Drawing Sheets

Related U.S. Application Data

(60) Provisional application No. 61/239,769, filed on Sep. 3, 2009.

(51) Int. Cl.
  *H02P 9/02* (2006.01)
  *H02P 25/18* (2006.01)

(58) Field of Classification Search
  USPC ............................. 318/768; 363/37; 307/38
  See application file for complete search history.

(56) References Cited

U.S. PATENT DOCUMENTS

| | | | |
|---|---|---|---|
| 3,870,928 A * | 3/1975 | Allen ................. | H01H 51/287 361/23 |
| 3,984,750 A | 10/1976 | Pfeffer et al. | |
| 4,159,496 A * | 6/1979 | Stevens ................. | A61G 7/018 307/115 |
| 4,338,557 A | 7/1982 | Wanlass | |
| 4,389,691 A * | 6/1983 | Hancock ................ | H01H 9/542 307/135 |
| 4,394,720 A | 7/1983 | Gabor | |
| 4,639,647 A * | 1/1987 | Posma ................... | H02P 7/281 318/246 |
| 4,779,038 A * | 10/1988 | Eckerfeld .............. | G05D 23/24 323/241 |
| 4,948,044 A * | 8/1990 | Cacciatore ............. | H02J 9/061 165/238 |
| 5,065,305 A * | 11/1991 | Rich ....................... | H02K 47/30 318/768 |
| 5,146,146 A * | 9/1992 | Samann ................ | H02P 27/026 318/768 |
| 5,610,448 A * | 3/1997 | Dattilo .............. | H05B 37/0209 307/113 |
| 5,699,218 A * | 12/1997 | Kadah ................... | H01H 9/542 361/13 |
| 5,912,522 A | 6/1999 | Rivera | |
| 6,005,786 A | 12/1999 | Bluemel et al. | |
| 6,349,312 B1 | 2/2002 | Fresko et al. | |
| 6,501,195 B1 * | 12/2002 | Barton ................... | G06F 1/266 307/125 |
| 6,528,902 B1 * | 3/2003 | Barton ................... | H02J 9/005 307/38 |
| 6,563,717 B2 * | 5/2003 | Lunding ............... | H02M 3/285 363/15 |
| 6,731,019 B2 * | 5/2004 | Burns ................... | F03B 13/148 290/42 |
| 6,969,927 B1 * | 11/2005 | Lee .......................... | H02J 3/14 307/17 |
| 7,081,696 B2 | 7/2006 | Ritchey | |
| 7,102,248 B2 | 9/2006 | Wobben | |
| 7,348,764 B2 | 3/2008 | Stewart et al. | |
| 7,405,490 B2 | 7/2008 | Moehlenkamp | |
| 7,482,708 B1 * | 1/2009 | Barton ................... | G06F 1/266 307/30 |
| 7,545,052 B2 | 6/2009 | Llorente González et al. | |
| 7,554,303 B1 | 6/2009 | Kawamura | |
| 7,602,158 B1 * | 10/2009 | Iacob ................ | H02M 3/33523 307/17 |
| 7,649,274 B2 | 1/2010 | Burt | |
| 7,710,081 B2 | 5/2010 | Saban et al. | |
| 8,097,970 B2 | 1/2012 | Hyvärinen | |
| 8,138,620 B2 | 3/2012 | Wagoner et al. | |
| 8,212,371 B2 | 7/2012 | Maibach et al. | |
| 8,466,595 B2 | 6/2013 | Spooner | |
| 2002/0012261 A1 * | 1/2002 | Moindron ............ | H02M 7/125 363/127 |
| 2002/0057030 A1 | 5/2002 | Fogarty | |
| 2004/0037221 A1 * | 2/2004 | Aisa ..................... | H02J 13/0048 370/229 |
| 2004/0174652 A1 * | 9/2004 | Lewis ................... | H02H 9/005 361/118 |
| 2005/0099314 A1 * | 5/2005 | Aisa ........................ | H02J 3/14 340/637 |
| 2005/0248440 A1 * | 11/2005 | Stevens ............... | H02J 13/0048 340/12.33 |
| 2006/0056127 A1 * | 3/2006 | Lewis ................... | H02H 9/005 361/118 |
| 2006/0273766 A1 | 12/2006 | Kawamura | |
| 2007/0235440 A1 * | 10/2007 | Gu ........................ | H05B 1/0244 219/482 |
| 2008/0012538 A1 * | 1/2008 | Stewart .................. | H02P 9/48 322/89 |
| 2008/0088200 A1 | 4/2008 | Ritchey | |
| 2008/0116759 A1 | 5/2008 | Lin | |
| 2008/0266742 A1 * | 10/2008 | Henke .................... | H01H 9/542 361/166 |
| 2009/0267414 A1 * | 10/2009 | Kiyohara .............. | H02M 7/162 307/38 |
| 2010/0073970 A1 * | 3/2010 | Abolhassani ........... | H01F 30/12 363/37 |
| 2012/0194403 A1 * | 8/2012 | Cordier et al. .............. | 343/853 |
| 2012/0229060 A1 * | 9/2012 | Ritchey ................... | H02P 25/18 318/400.3 |

FOREIGN PATENT DOCUMENTS

| | | |
|---|---|---|
| EP | 1 416 604 A2 | 5/2004 |
| JP | 2001-204198 A | 7/2001 |
| KR | 10-2007-0082819 A | 8/2007 |
| WO | 81/00651 A1 | 3/1981 |
| WO | 88/07782 A1 | 10/1988 |
| WO | 98/08291 A1 | 2/1998 |
| WO | 2007/098227 A2 | 8/2007 |
| WO | 2008/119864 A1 | 10/2008 |

OTHER PUBLICATIONS

International Search Report, dated May 24, 2011, for PCT/US2010/047750, 3 pages.

Ritchey et al., "Variable Coil Configuration System and Method," filed Sep. 3, 2009, for U.S. Appl. No. 61/239,769, 23 pages.

Written Opinion, dated May 24, 2011, for PCT/US2010/047750, 4 pages.

First Office Action and Search Report (with English Translation) from corresponding CN application No. 201080039251.0, dated Jan. 30, 2014, 16 pages.

Ritchey et al., "Variable Coil Configuration System, Apparatus and Method," Office Action dated Dec. 4, 2013, for U.S. Appl. No. 13/393,749, 17 pages.

Canadian Examination Report, dated Mar. 3, 2017, for CA 2,773,102, 4 pages.

European Examination Report, dated Apr. 18, 2017, for EP 10 814 529.3, 6 pages.

* cited by examiner

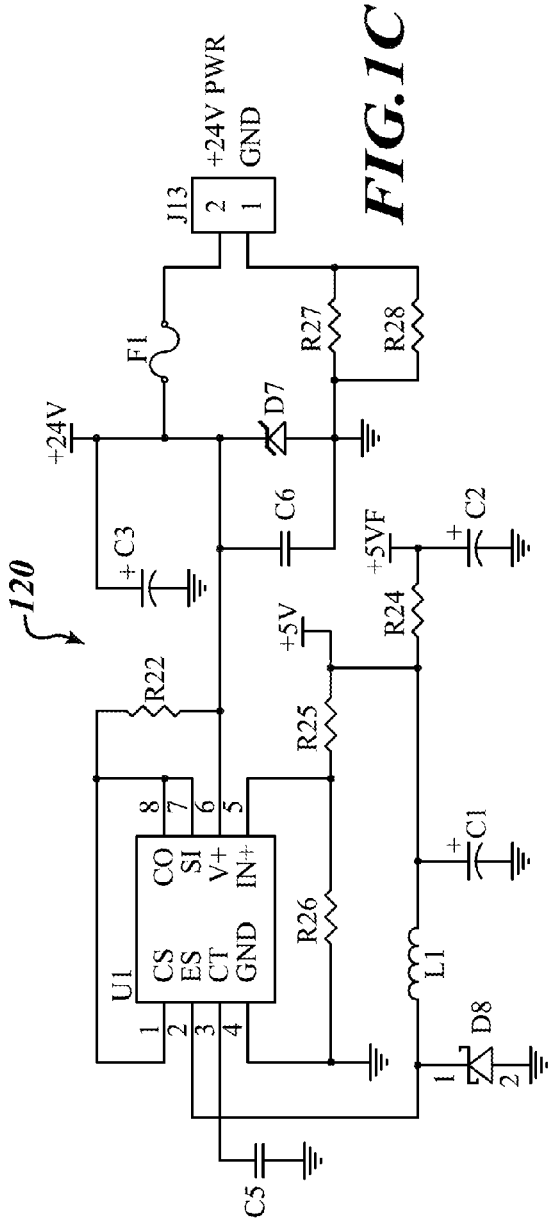
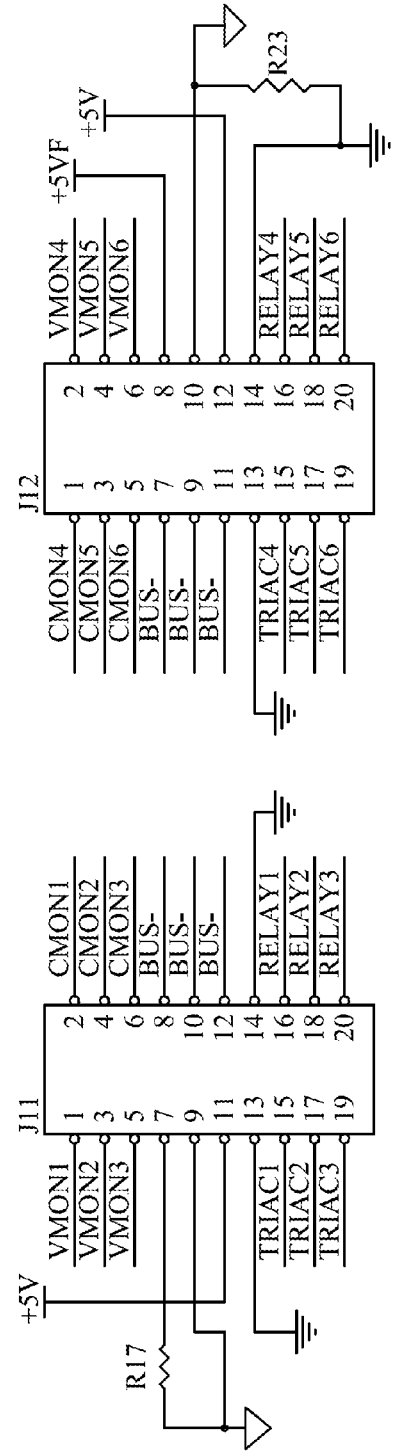
FIG.1C
FIG.1D
FIG.1E

VARIABLE COIL CONFIGURATION SYSTEM, APPARATUS AND METHOD

BACKGROUND

Field

This application generally relates to electric machines with coils or windings (e.g., generators, motors), and more particularly to systems, apparatus and methods that configure coils or windings of multistage electric machines.

Description of the Related Art

For conventional fluid-flow electrical-generation turbine systems, such as wind turbine systems, in which the energy source is variable (i.e., the fluid speed and/or the rate of flow of the fluid varies over time), the amount of energy captured from the energy source may only be a fraction of the total of the capturable energy. For example, in a typical wind farm, that fraction may be one half, or less of the total capturable energy.

The power flow though a variable-speed conventional turbine/generator/transformer system is restricted in the range of power that can be output, i.e., from a minimum output power to a rated output power, due to limitations of the generator, the power converter (if present), and/or the output transformer used within the system. This restriction arises because conventional electromagnetic generators have reduced efficiency at lower power levels, as does the power converter (if present) and particularly the transformer that couples power to the electrical load. As a result, for conventional variable-speed turbine/generator/transformer systems an engineering design decision is usually made to limit the power rating of the generator (and any associated power converter, power conditioner or power filter, if present) and the associated output transformer so as to optimize efficiency over a restricted range of power. Therefore, at the extremes of normal-operating fluid speeds, i.e., at a low fluid speed and especially at a high fluid speed, less power is coupled into the turbine than is otherwise possible to extract from the fluid energy source. For a given design of turbine diameter, and possibly axial length, this translates, over time, into less energy capture than the turbine may be capable of transmitting to the generator.

To increase energy capture in situations in which the energy source has a variable speed of fluid driving the turbine, and in which the turbine may have a variable speed of rotation, a multi-stage generator may be used in the turbine system. A multi-stage generator is an electric machine operating as an electrical generator that takes mechanical energy from a prime mover and generates electrical energy, usually in the form of alternating current (AC) power. Such a multi-stage generator is disclosed in U.S. Pat. No. 7,081,696 and U.S. Patent Application Publication No. 2008088200. An advantage of a multi-stage generator over a conventional generator is that a multi-stage generator can be dynamically sized depending on the power output of the turbine. A conventional generator is effective at capturing energy from the energy source over a limited range of fluid speeds, whereas a multi-stage generator is able to capture energy over an extended range of fluid speeds of the energy source, due to staged power characteristics.

The electrical power that is generated from a multi-stage generator is variable in nature, meaning the output power waveforms produced may vary from time to time, for example in: voltage amplitude; current amplitude; phase; and/or frequency. Additionally a multi-stage generator may include a plurality of induction elements, each of which generates its own power waveform, which may differ in voltage amplitude, current amplitude, phase, and/or frequency, from that generated by other induction elements within the generator. An electrical load such as an electric utility power grid may not be capable of directly consuming the electrical power that is generated by a multi-stage generator, as the power generated may not be in a suitable form, for example with respect to waveform shape as a function of time, voltage amplitude, current amplitude, phase, and/or frequency, as may be required by the electrical load. An electrical load such as a utility power grid typically expects from a turbine electrical generation system a single-phase, or split-phase, or 3-phase voltage or current waveform that is usually sinusoidal, and relatively stable. However, a multi-stage generator typically generates varying waveforms.

Past attempts to maintain a consistent output range voltage from such generators have required either the linking together of multiple generators, each optimized for a particular input range, or complex switching networks. These solutions are costly and complex, which in turn, makes them less reliable and limits the available switching range.

U.S. Pat. No. 3,984,750 is directed to an alternator-rectifier unit in which separate three-phase windings are connected to individual rectifiers arranged for series-parallel switching to improve current-voltage characteristics. Notably, such employs switching on the direct current (DC) side of the rectifier. Such circuit is associated with relatively high losses, experiencing four diode voltage drops. Such is not extended beyond a single coil configuration switch.

U.S. Patent Application No. 2007/0182273 describes circuitry for configuring generator coils in various series/parallel combinations. This disclosure has 4 coils configured using 14 switches. Each switch carries multiple coil loads, up to full section current in parallel case. The system uses 12 switches in circuit for a series case, and up to 10 switches in circuit in parallel case.

The concept of independent induction elements and the ability to electrically configure such elements in various configurations offers benefits, however, manufacture of such a design may be challenging and expensive. If the wiring outputs of the machine's induction elements are independently run to a common configuration controller, the numbers of wires could become unmanageable. For example, if the generator had 50 coils per stack (i.e., 50 induction elements) that would result in 100 wires connecting to each stack. For a six stack machine, 600 wires would be used, that must all be properly connected to the appropriate contacts on a single configuration controller. It would be highly challenging to track the wires during assembly, and there are numerous other challenges that result.

New systems, methods and apparatus that allow variable coil configuration of electric machines are desirable.

BRIEF SUMMARY

Embodiments of the present system and method include a variable configuration controller (referred to as a "VCC") system and method to connect multiple generator coil windings in varying series or parallel combinations to maintain a relatively consistent output voltage (for example, within a 2:1 range) in response to varying input shaft speeds. The VCC may be used with various electric machines, for instance single or multi-phase generators, and provides a rectified DC output from each AC phase input from an induction element. The DC output may optionally be used with a Power Factor Correction ("PFC") circuit to increase the efficiency of generator operation by smoothing the current wave shape to a near sinusoid.

The systems, apparatus and methods allow the configuration of multiple coils or windings in variable series/parallel combinations. The systems, apparatus and methods may also allow switching series and parallel coils or windings in tandem with rectification, rather than switching on the DC side, post-rectification. This may be accomplished using fewer switches than in previously described systems. In fact, parallel configuration can be achieved with no switches or with the switches open.

A variable coil configuration system may be summarized as including a plurality of bridge rectifiers, the bridge rectifiers each having a pair of AC nodes on an AC side of the respective bridge rectifier and a pair of DC nodes on a DC side of the respective bridge rectifier; and a first number of switches, each of the switches of the first number of switches on the AC side of a respective one of the bridge rectifiers, wherein each of the bridge rectifiers couple at least two coils electrically in parallel with one another when a respective switch of the first number of switches is open and the at least two coils are not subject to an open circuit condition, a low voltage condition or a short circuit condition, and each of the switches of the first number of switches is operable to selectively electrically couple the at least two coils electrically in series with one another when the switch is closed. The bridge rectifiers may automatically electrically isolate a respective one of the coils of the electric machine from a parallel combination with at least one other one of the coils of the electric machine when the respective one of the coils experiences either a short circuit condition, a low voltage condition or an open-circuit condition. The bridge rectifiers may automatically electrically couple the respective one of the coils of the electric machine in series with at least one other one of the coils of the electric machine when the respective one of the coils experiences either the short circuit condition, the low voltage condition or the open-circuit condition. The first number of switches may be semiconductor based switches (e.g., TRIACS, IGBTs, FETs, SSRs).

The variable coil configuration system may further include a controller configured to switch the triacs at a respective zero crossings of a respective current.

The variable coil configuration system may include one semiconductor based switch for each of the coils of the electric machine, and may further include a second number of switches, each of the switches of the second number of switches operable to selectively couple the at least two coils between being electrically in parallel with one another when the switch is open and electrically in series with one another when the switch is closed, the switches of the second number of switches on the AC side of the respective bridge rectifier and electrically in parallel with respective ones of the first number of switches, wherein the switches of the first number of switches are faster acting than the switches of the second number of switches and the switches of the second number of switches have a lower associated electrical loss than an electrical loss associated with the switches of the first number of switches. The second number of switches may be mechanical switches (e.g., mechanical relays, contactors). There may be one mechanical switch for each of the coils of the electric machine. All of the bridge rectifiers of the plurality of bridge rectifiers may be coupled to a common heat sink.

The variable coil configuration system may further include a power factor correction circuit applying a power factor correction at a DC output of the variable coil configuration system. A number of active switches may be selectively operable to reverse a current flow from a DC bus to the coils to operate the electric machine as a motor.

The variable coil configuration system may further include an additional bridge rectifier coupled to an end of a string formed by the bridge rectifiers of the first number of bridge rectifiers to couple the variable coil configuration electrically in parallel with a second variable coil configuration system; at least one additional switch operable to selectively couple the variable coil configuration electrically in series with the second variable coil configuration system; and a coupler configured to detachably electrically couple the second variable coil configuration system to the variable coil configuration system.

A method of operating a variable coil configuration system that comprises a plurality of bridge rectifiers, the bridge rectifiers each having a pair of AC nodes on an AC side of the respective bridge rectifier and a pair of DC nodes on a DC side of the respective bridge rectifier and a first number of switches, each of the switches of the first number of switches on the AC side of a respective one of the bridge rectifiers, may be summarized as including selectively coupling at least two coils of the electric machine electrically in parallel with one another via a respective one of the bridge rectifiers; and selectively coupling at least two coils of the electric machine electrically in series with one another via a respective one of the first number of switches. Selectively coupling at least two coils of the electric machine electrically in parallel with one another via a respective one of the bridge rectifiers may include selectively coupling a first two coils electrically in parallel with one another at a first time and wherein selectively coupling at least two coils of the electric machine electrically in series with one another via a respective one of the first number of switches may include selectively coupling the first two coils electrically in series with one another at a second time, different from the first time. Selectively coupling at least two coils of the electric machine electrically in parallel with one another via a respective one of the bridge rectifiers may include selectively coupling a first two coils of a first pair of coils electrically in parallel with one another at a first time and wherein selectively coupling at least two coils of the electric machine electrically in series with one another via a respective one of the first number of switches may include selectively coupling a second two coils, different from the first two coils, electrically in series with one another during the first time.

The method may further include switching a state of the switches of the first number of switches by a controller at a respective zero crossings of a respective current.

The method may further include automatically electrically isolating a respective one of the coils of the electric machine from a parallel combination with at least one other one of the coils of the electric machine by a respective one of the bridge rectifiers when the respective one of the coils experiences either a short circuit condition, a low voltage condition or an open-circuit condition.

The method may further include automatically electrically coupling the respective one of the coils of the electric machine in series with at least one other one of the coils of the electric machine when the respective one of the coils experiences either the short circuit condition, the low voltage condition or the open-circuit condition.

The variable coil configuration system may further include a second number of switches, each of the switches of the second number of switches on the AC side of a respective one of the bridge rectifiers and electrically in parallel with a respective one of the switches of the first number of switches, wherein the switches of the first number of switches are faster acting than the switches of the second number of switches and the switches of the second number of switches may have a lower associated electrical loss than an electrical loss associated with the switches of the first number of switches, and the method may further include for the coils of the electric machine that are electrically coupled in series with one another by the respective switch of the first number of switches, further coupling the coils of the electric machine electrically in series with one another by a respective one of the switches of the second number of switches immediately following the coupling electrically in series of the coils by the respective switch of the first number of switches.

The method may further include correcting a power factor of a current at a DC output of the variable coil configuration system.

The method may further include selectively reversing a current flow from a DC bus to the coils to operate the electric machine as a motor.

The method may further include detachably electrically coupling a second variable coil configuration system to the variable coil configuration system. Selectively coupling at least two coils of the electric machine electrically in series with one another via a respective one of the first number of switches may include selectively coupling at least two coils of the electric machine electrically in series with one another via a respective triac, an insulated gate bipolar transistor, a field effect transistor or a solid state relay.

A variable coil configuration system may be summarized as including a plurality of bridge rectifiers, at least one bridge rectifier for each pair of coils of an electric machine, the bridge rectifiers each having a pair of AC nodes on an AC side of the respective bridge rectifier and a pair of DC nodes on a DC side of the respective bridge rectifier; and a first number of switches, each of the switches of the first number of switches operable to selectively electrically couple respective pairs of coils from being electrically in parallel when the switch is open to electrically in series with one another when the switch is closed, each of the switches of the first number of switches on the AC side of a respective one of the bridge rectifiers.

A variable coil configuration system may be summarized as including a plurality of bridge rectifiers, at least one bridge rectifier for each pair of coils of an electric machine, the bridge rectifiers each having a pair of AC nodes on an AC side of the respective bridge rectifier and a pair of DC nodes on a DC side of the respective bridge rectifier; and a first number of switches, each of the switches of the first number of switches on the AC side of a respective one of the bridge rectifiers, wherein each of the bridge rectifiers couple the coils of a respective pairs of coils electrically in parallel with one another when a respective switch of the first number of switches is open and the coils of the respective pair are not subject to an open circuit condition, a low voltage condition or a short circuit condition, and each of the switches of the first number of switches is operable to selectively electrically couple the coils of the respective pair of coils electrically in series with one another when the switch is closed.

A method of operating a variable coil configuration system that comprises a plurality of bridge rectifiers, at least one bridge rectifier for each coil of an electric machine, the bridge rectifiers each having a pair of AC nodes on an AC side of the respective bridge rectifier and a pair of DC nodes on a DC side of the respective bridge rectifier and a first number of switches, each of the switches of the first number of switches on the AC side of a respective one of the bridge rectifiers, may be summarized as including selectively coupling at least one pair of coils of the electric machine electrically in parallel with one another via a respective one of the bridge rectifiers; and selectively coupling at least one pair of coils of the electric machine electrically in series with one another via a respective one of the first number of switches. Selectively coupling at least one pair of coils of the electric machine electrically in parallel with one another via a respective one of the bridge rectifiers may include selectively coupling two coils of a first pair of coils electrically in parallel with one another at a first time and wherein selectively coupling at least one pair of coils of the electric machine electrically in series with one another via a respective one of the first number of switches may include selectively coupling the two coils of the first pair of coils electrically in series with one another at a second time, different from the first time. Selectively coupling at least one pair of coils of the electric machine electrically in parallel with one another via a respective one of the bridge rectifiers may include selectively coupling two coils of a first pair of coils electrically in parallel with one another at a first time and wherein selectively coupling at least one pair of coils of the electric machine electrically in series with one another via a respective one of the first number of switches may include selectively coupling two coils of a second pair of coils, different from the first pair of coils, electrically in series with one another during the first time.

The VCC system advantageously employs AC-side parallel/series switching, combined with AC/DC rectification, and DC/DC blocking capabilities of the bridge rectifiers. While the AC side switches (e.g., relay, IGBT, SSR, or any other switch) perform part of the switching action, the diode rectifier bridges perform series combination, isolation of intermediate step points, and connection of the appropriate coil terminals, and only those terminals, to the output. Thus, the diode rectifier bridges allow not only AC-DC rectification, but parallel current sharing, intermediate step isolation, and conduction of the 'end point' terminals to the DC bus output.

The VCC system described herein avoids the high losses associated with other devices. For example, the VCC system produces only two diode drops no matter how many series/parallel coils are used or configured, compared to four diode drops of the device described in U.S. Pat. No. 3,984,750.

The VCC system described herein also employs a relatively simple switching scheme. Such advantageously avoids the complex switching scheme using a large number of switches, and associated losses, such as that described in U.S. Patent Application Publication No. 2007/0182273. That device uses 4 to 12 series switch elements for four coils, in contrast to the 1:1 ratio achievable using the VCC system described herein. Additionally, device of the U.S. Patent Application Publication No. 2007/0182273 requires the switch contacts to carry the parallel current of all coils. In contrast, VCC system described herein requires the switch contacts to carry the series current of only one coil per switch. This is a significant advantage since such reduces power losses, as well as allowing use of lower rated switches.

Even further, the VCC system described herein provides some inherent fault tolerance against both open and shorted coils. For example, if a given coil is short-circuited, or has a lower output voltage than other coils, the diode bridge rectifiers will isolate that coil from parallel combination. In the case that the shorted coil is series combined with other coils, the whole string may be isolated from the output if there are other series-parallel circuits or the output voltage may be reduced if there is only one series coil string (i.e., all coils series mode). Importantly, in no case is the output loaded down by the shorted coil, as would occur in AC-side switching type devices described in U.S. Patent Application Publication No. 2007/0182273. Also for example, if a given coil is open-circuited, the diode bridge rectifiers will isolate that coil from parallel combination. In the case that the open coil is series combined with other coils, the whole string containing the open coil will be isolated from the output.

When used, a dual-element TRIAC/relay switch combination provides further advantages. In particular, fast switching of the semiconductor element (e.g., TRIAC, or IGBT, or FET, or SSR) allows zero-cross switching. This controls transients and extends switch life. Meanwhile, low power loss of relay contacts means significantly higher switching efficiency of the VCC system. This combination adds additional cost and complexity, but the VCC system is unique in requiring as few as a single (i.e., one) switch element per coil and only requiring the switch carry the series current for that coil only. Hence, this extra cost and complexity is acceptable.

Further, the VCC system may advantageously employ a common heat exchange structure (e.g., heat sink) for all diode bridge rectifiers in a given VCC. Such may facilitate maintaining equal current sharing among coils in parallel. In particular, a common heat exchange structure maintains an approximately equal temperature of all diodes so that their forward voltage drop also remains equal. This equal forward voltage drop helps maintain equal current sharing.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings. The various embodiments are illustrated by way of example and not by way of limitation in the accompanying Figures.

FIGS. 1A-1H are a schematic circuit diagram showing power circuits of a variable configuration controller system according to one illustrated embodiment, including a plurality of bridge rectifiers, a first number of switches in the form of triacs and a second number of switches in the form of relays connected in parallel with the triacs between respective pairs of coils, and an associated sixth switch circuit for coupling to another circuit board in a modular fashion.

DETAILED DESCRIPTION

Figure 1A:
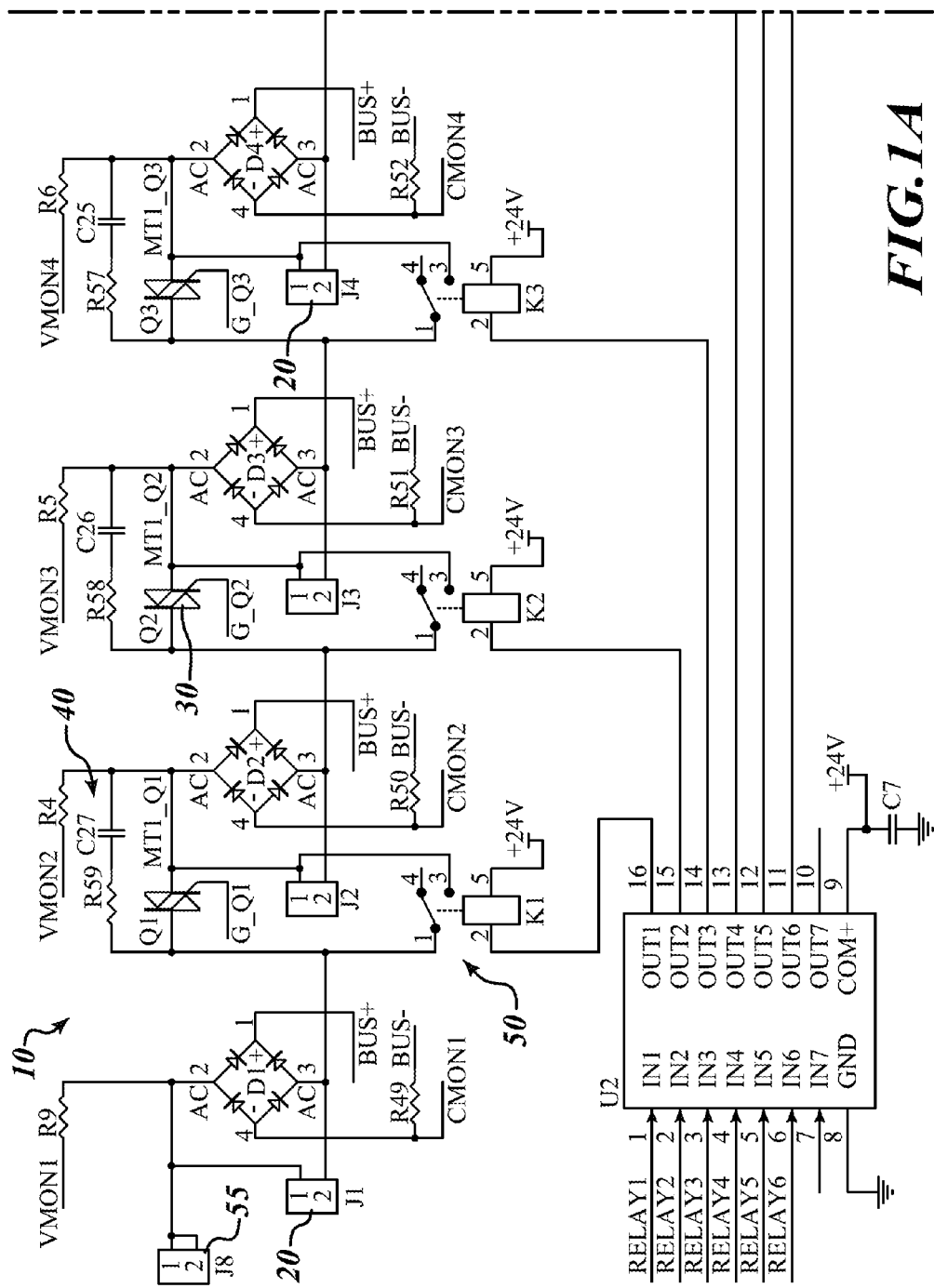

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electric machines (e.g., generators, motors), control systems, and/or power conversion systems (e.g., converters, inverters, rectifiers) have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

In the Figures, the following circuit elements are identified by the corresponding reference numbers:

| | |
|---|---|
| VCC System | 1 |
| Bridge rectifiers | D1-D5, collectively 10 |
| Coil connector blocks | J1-J6, collectively 20 |
| Semiconductor switches, e.g. Triacs | Q1-Q5, collectively 30 |
| Snubber network | 40 |
| Relay | 50 |
| Expansion port | 55 |
| Gate drive | 70 |
| DC bus output connection | 80 |
| Controller | 90 |
| Analog multiplexer | 100 |
| RS485 interface | 110 |
| Power source | 120 |
| Amplifiers | 130 |
| Heat sink | 140 |

A VCC system 1 (FIGS. 1A-1H, 2A-2F) is a power electronics system configured to adjust multiple induction elements, such as coil windings of an electric machine (e.g., generator, electric motor), in various series and parallel combinations to maintain a relatively constant output voltage in response to varying input shaft speeds. The electric machine may use permanent magnets, electromagnets, a hybrid, and be core or coreless. A VCC system 1 may be used with a multi-phase electric machine, although each phase is managed in isolation by a separate circuit embodiment. A VCC system 1 can provide rectified DC output from each AC phase input, where the VCC system 1 is primarily intended for use with a subsequent Power Factor Correction (PFC) circuit. However, a VCC system 1 may also be used without PFC on the DC outputs. A VCC system 1 could be used with a PFC at the DC output, or a non-PFC with a single DC output. An alternative embodiment of a VCC system 1 could output AC.

The VCC system 1 may operate using a number of devices or elements separately or in cooperation to connect the coils in the electric machine electrically in series and/or parallel. These devices or elements may include triacs, relays (e.g., solid state relays), bridge rectifiers, transistors and combinations thereof. The series coil configuration can be achieved by connecting the top side of one coil winding to the bottom side of the next coil winding by any suitable means.

A VCC system 1 may work in conjunction with a power conversion system, such as the power conversion system and method described in U.S. Provisional Patent Application No. 60/094,007.

Bridge Rectifiers

FIG. 1 shows a VCC system 1a, according to one illustrated embodiment. The VCC system 1a includes a plurality of bridge rectifiers D1-D6 (collectively 10). Each bridge rectifier 10 corresponds to a coil, from which bridge rectifier 10 is electrically coupled to receive AC input. The coils may be connected by suitable connectors J1-J6 (collectively 20). In a six coil embodiment, six bridge rectifiers 10 may be present, as illustrated in FIGS. 1A and 1B. Bridge rectifiers 10 may provide several functions for the VCC system 1a, including:

1. AC to DC conversion (i.e., rectification). AC to DC conversion is needed if a subsequent PFC circuit is used.
2. Coil series and parallel switching using diode biasing. When the coils are connected together in series, different diodes within bridge rectifier 10 conduct in an appropriate configuration and can therefore isolate coils from the bus and thereby prevent coils shorting to the wrong side of bus. Therefore bridge rectifier 10 acts as switch in conjunction with a series switch, such as a semiconductor type switch (e.g., triode for alternating current (triacs), insulated gate bipolar transistors (IGBTs), field effect transistors (FETs), or solid state relays (SSR)) Q1-Q5 (collectively 30) or relay K1-K5 (collectively 50).
3. Coil current sharing in conjunction with coil resistances. Bridge rectifiers 10 initially maintain the coils in parallel. If the coil voltages are approximately equal, the current is shared between the coils to the outputs. If one coil has a higher voltage than the others, that coil then provides all of the current to the output, and the coils having lower voltages are isolated from the output. Given that the coils will not have precisely the same voltages, the load current sharing between coils can be maintained if they have approximately equal resistances.

In one implementation of the VCC system 1a, 1b, bridge rectifiers 10 may be GBU8U devices, each capable of 8 A, 600V operation. Such requires an adequate heat sink. In six parallel coil mode, a maximum output power of 420V RMS (600 VDC peak) at 48 A RMS (6×8 A), or 20.2 kW is possible. If only six coils are present, the six parallel coil mode represents the maximum output power possible from the VCC system 1a. At 220V RMS, 48 A RMS, the maximum output in six parallel coil mode is 10.6 kW (per phase).

The bridge rectifiers 10 are therefore involved in providing the coil series and parallel switching function. The bridge rectifiers 10 also convert the AC current to DC current for receipt by a DC bus for transmission to an electrical load. Also, if a coil has an internal short, its lower output voltage causes the bridge rectifier 10 to which it is connected to be reverse biased, automatically isolating that coil from the output circuit. Likewise, while all coils are normally active, should a coil be switched off, the appropriate bridge rectifier 10 will automatically isolate that coil from the output circuit.

If three parallel coil mode is selected as a nominal operating point based on a prime mover and/or load requirement, the six parallel coil mode can be used for over-speed or over-torque operation for peak load handling. In this case, the operating point current at the nominal operating point should be lowered from 8 A to allow higher currents at peak load to be within the bridge diode ratings. If 6 A is chosen for the nominal operational level, the nominal power at 220V is then 220V×6 A RMS×3=3.96 kW per phase. Thus bridge rectifiers 10 diode ratings may be at least 15 A.

Active switches (not shown) may be placed across one or more of bridge rectifiers 10. These switches may be FETs, IGBTs, bipolar transistors, or any other suitable DC switching devices with high speed operation. These switches may be pulse-width modulated (PWM) to apply a variable DC voltage from the output bus to the coil connector blocks 20, thereby capable of reversing or changing the operation of the generator to that of a speed-controlled motor. In particular, the switches (not shown) may reverse current flow from the DC bus to the coils of the electric machine at appropriate times in order to provide a rotating magnetic field suitable for motor operation.

Semiconductor Switches

The semiconductor switches 30 may take a variety of forms, for example triacs, IGBTs, FETs, SSRs. Triacs are a bidirectional electronic switches for AC current that conducts current in either direction. The triac conducts and latches (i.e., stays ON) until the current load is removed, which for example may occur at zero crossing or a minimal level of current.

As illustrated in FIG. 1, five semiconductor switches 30 such as triacs, individually labeled as Q1 through Q5, may be used to control six coils of an electric machine. These triacs Q1-Q5 can be individually controlled by controller 90 (FIG. 2D) to enable series and parallel coil combinations in a six coil machine as follows:

1. Six parallel coils: All triacs Q1-Q5 are OFF.
2. Three parallel coils, two series coils in each: triacs Q1, Q3, Q5 are ON; triacs Q2 and Q4 are OFF.
3. Two parallel coils, three series coils in each: triacs Q1, Q2, Q4, and Q5 are ON, triac Q3 is OFF.
4. Four series coils: either Q1, Q2, Q3; or Q2, Q3, Q4 or Q3, Q4, Q5 are ON. The other triacs are OFF.
5. Five series coils: triacs Q1, Q2, Q3, Q4; or triacs Q2, Q3, Q4, Q5 are ON. The other triac is OFF.
6. Six series coils: triacs Q1, Q2, Q3, Q4, Q5 (all triacs) are ON.

Coil series configuration controlled by triacs 30 provides enhanced operation due to lower current waveform distortion achieved by 'zero cross switching' of triac 30, i.e., when the AC current waveform drawn from the switched coil is at its minimum value.

The VCC system 1 may also include a number of relay switches 50, which may operate independently, or in conjunction with triacs 30. For example, the VCC system illustrated in FIG. 1 includes five relay switches, individually labeled K1-K5, each electrically in parallel with a respective one of the triacs Q1-Q5. Relay switches 50 provide for a low level of losses when switching, but are slow to switch (i.e., change state) in reaction to a switch command. Triacs 30 react to switch commands quickly but have higher losses when compared to relay switches 50. Thus, using both triacs 30 and relay switches 50 advantageously allows a multi-step switching process to be used. The appropriate triac 30 reacts first and switches state accordingly. Then, the corresponding relay switch 50 switches or changes state, taking over the load. The corresponding triac 30 is disengaged for this purpose, until the next switching or change takes place.

Figure 1B:
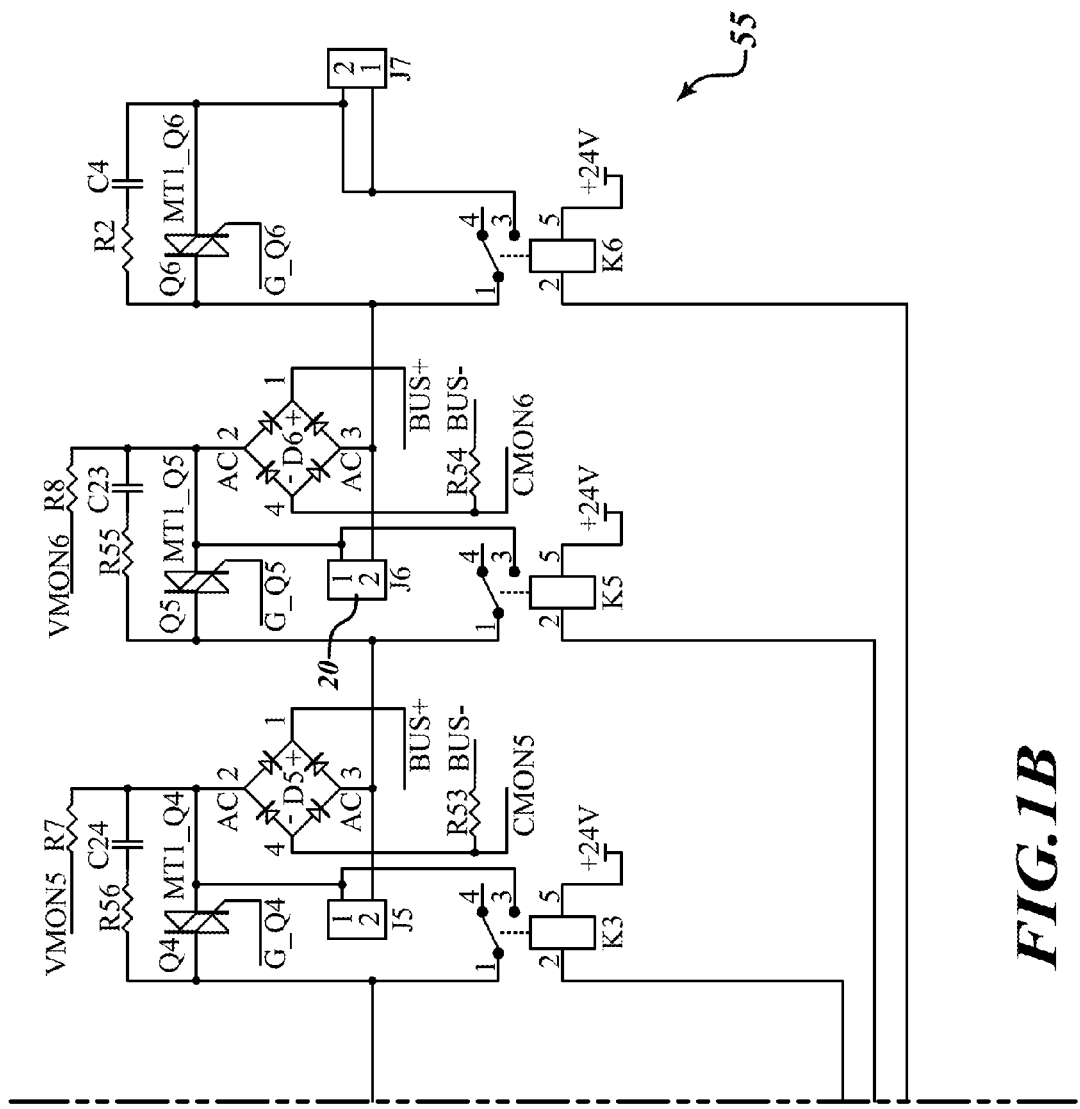
Figure 1F:
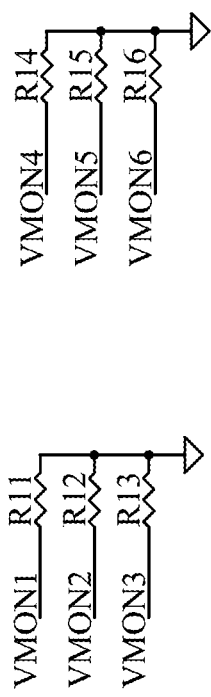
Figure 1G:
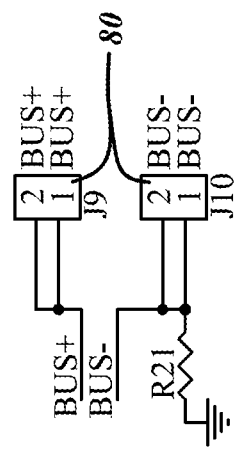

The VCC system 1 may employ a number of box headers (e.g., 10×2) J11 (FIG. 1D), J12 (FIG. 1E) to provide selectively detachable communicative coupling between a controller 90 (FIG. 2D) and various other VCC system elements, for example the triacs Q1-Q5 (FIGS. 1A, 1B) and relays K1-K5 (FIGS. 1A, 1B).

Respective gate drive circuits 70*a*-70*f* (FIG. 1H, collectively 70) are repeated at each zero cross to ensure triac 30 "ON" control. Changing triac 30 drive signals G Q1-G Q5 only at zero cross also prevents unintended series configurations (the zero cross detection ensures all triacs 30 except those with a gate drive are "OFF"). The zero cross detection circuits may use A/D conversion of both voltage and current inputs, and a digital filter for averaging and zero cross estimation to increase robustness and frequency range. Zero crossing detection may be performed in digital signal processing in controller 90 (e.g., U101, FIG. 2D) by measuring voltages VMON1-VMON6 and currents CMON1-CMON 6 through multiplexers 100 (e.g., U4, U5, FIGS. 2A and 2B), signal amplifiers 130 (FIGS. 2A and 2B) and buffers U7 (FIGS. 2A, 2B), and the processor internal A/D converter within controller 90 (e.g., U101, FIG. 2D).

A current monitor circuit may be present for zero cross detection. The current monitor circuit could be used for zero cross trigger switching of triacs 30. In particular, current monitoring resistors R49-R54 (FIGS. 1A and 1B) present a voltage drop proportional to current flow in each coil, selected by multiplexers 100 (e.g., U4, U5, FIGS. 2A and 2B), amplified by amplifiers 130, and converted to digital representation by an A/D converter within controller 90 (e.g., U101, FIG. 2D).

Figure 4:
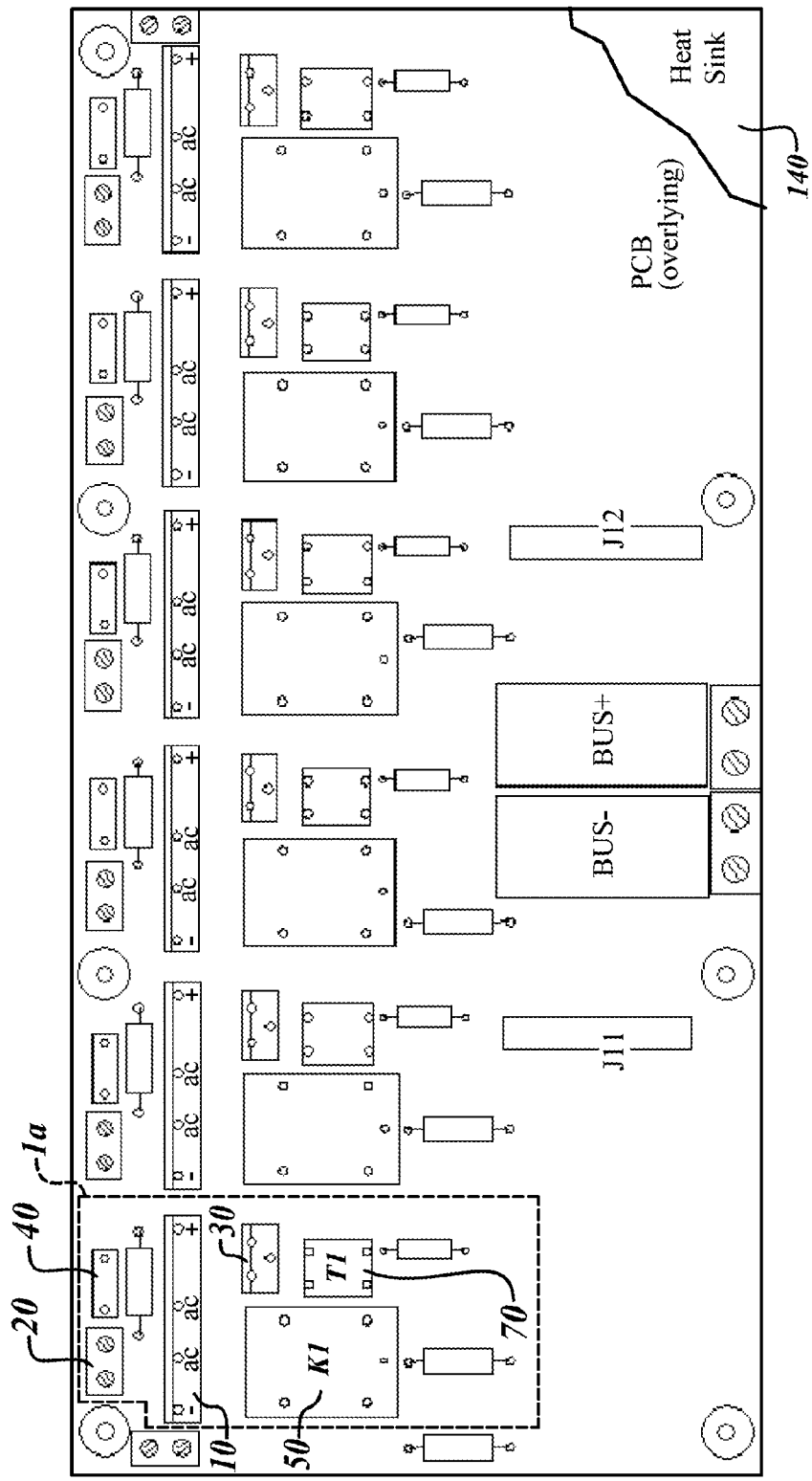
FIG. 4 is a top plan, partially broken, view showing a circuit board and a heat sink and illustrating a physical layout of various element of the variable configuration controller system on a circuit board, according to one illustrated embodiment.

Within the 100 Ohm and 0.1 uF networks, across each triac 30 are snubber networks 40 (only one called out in FIG. 1A and FIG. 4). The snubber networks 40 absorb voltage transients which otherwise might cause false triggers of triacs 30 at turn-OFF or zero-cross points. Snubber network 40 may use a carbon-composition resistor that has high pulse handling capabilities (many kW for short pulses), but is only 1/2 W continuous rated. The 100 ohm 0.1 uF combination may be limited to 110 VAC at 1 kHz or 220 VAC at 500 Hz due to continuous power dissipation in the snubber resistance. Higher voltage operation of the VCC system 1 requires lowering both the resistance and capacitance value. The snubber could be designed for greater voltage, e.g., a 47 ohm and 0.033 uF snubber would allow for 500 VAC at 1 kHz.

Bridge rectifiers 10, when connected to a load, may also act as snubbers for transient energy across the switching elements, whether those elements be triacs 30, relay contacts 50, or transistors. Such a configuration may eliminate the need for the snubber network 40. Additionally, there are triacs 30 available (for example those sold in association with the trademark ALTERNISTOR®), that do not require snubber networks 40.

Figure 1H:
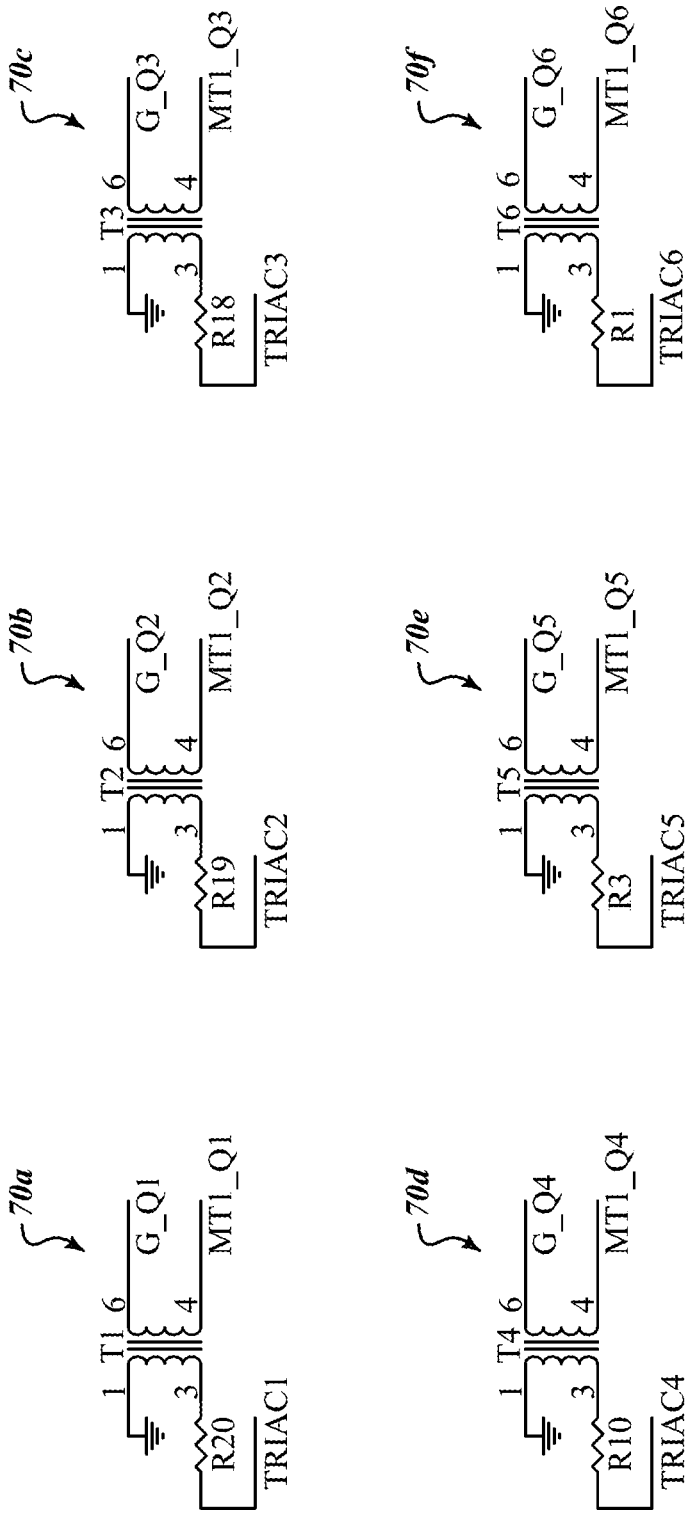

Gate drive 70 circuits may include isolation transformers T1-T6 (FIG. 1H), coupling capacitors (not shown), such as 0.47 uF AC coupling capacitors, and coupling discharge resistances (not shown), typically 10 k, coupled across a primary side of the isolation transformers T1-T6. The digital control output circuits are isolated from the high voltage at the triac gates by transformers T1-T6. In addition, a 2:1 winding ratio provides a 4:1 impedance transformation so that controller 90 may supply up to the required 50 mA triac gate drive level. 74HCT574 buffer/driver/level converter circuits U102, U103 (FIG. 2C) may be included within gate drive circuit 70 (FIG. 1H). These circuits U102, U103 isolate the gate drive circuit 70 power supply noise from controller 90, allow a level convert to a 5V drive, and free input/output (I/O) pins. For example, these circuits U102, U103 may translate the 3.3 processor or controller 90 (e.g., U1, FIG. 2D) logic levels to 5V levels at higher current capacity suitable for driving relay drivers U2 of the power circuit board (i.e., VCC_PWR), LEDs D101-D104 (FIG. 2F) of the control circuit board (i.e., VCC_MCU), and triac transformers T1-T6 of the power circuit board (i.e., VCC_PWR).

Relay contacts may be added across the triacs 30 to reduce loss, at the cost of additional complexity. Such contacts may be +24V coil, 10 A SPST contacts.

An expansion port 55 may be provided within the VCC system 1. For example, an extra triac Q6 and/or relay switch (as appropriate) K6 at one 'end' (either the 'top' or 'bottom' of the coil stack) allows connection to another VCC system module to expand the coil series switching capability. This 'switch' expansion port 55 may be coupled to the 'unswitched' side of the next VCC system module (i.e., the 'top' of one coil stack connected to the 'bottom' of the next coil stack).

Heat Sink

As illustrated in FIG. 4, the VCC system 1 may include a heat exchange structure (e.g., heat sink, heat spreader and/or heat pipe) 140. A variety of passive and/or active heat exchange structures may be used. The heat exchange structure 140 can provide at least three functions. The heat exchange structure 140 may remove heat from bridge rectifiers 10. The heat exchange structure 140 may remove heat from triacs 30. The heat exchange structure 140 may equalize bridge rectifier 10 temperatures, which may facilitate proper parallel mode current sharing between bridge rectifiers 10.

A relatively small heat exchange structure 140 such as a small heat sink may be capable of less than 50 W of dissipation, which is suitable for greater than 2 kW of output power per phase.

Current Monitoring Amplifiers

Amplifiers 130 (FIGS. 2A, 2B) may provide differential amplification of the low-voltage current monitoring signal produced in the low-value (approximately 0.004 ohms) current shunt resistances formed by small lengths of wire or printed circuit board traces. Amplifiers 130 may have a differential gain of 100 and an output range of about 4V which results in a full scale current capability of about 10 A. These amplifier circuits need not be precise due to variations in current shunt resistance values, but are intended to give representative current measurement results, which is useful for zero cross detection (digital signal processing mode), fault detection, and operational reporting.

Controller

The controller 90 (FIG. 2D) may take a variety of forms. For example, the controller 90 may take the form of a microcontroller, microprocessor, application specific integrated circuit or programmable gate array. For instance, the controller 90 may take the form of a PIC16F883 microcontroller (U101). The controller 90 is the core of the VCC system 1, controlling operation, providing a memory, a processor, A/D conversion, digital I/O, timing functions, as well as serial communications. A 20 MHz clock crystal may result in 5MIPS instruction execution speed. Firmware may be programmed in approximately 1500 lines of assembly code. The microcontroller code may have a C source, which would improve portability and readability and increase the capability of the VCC system 1 to deal with more complex systems.

Controller 90 may take the form of a higher performance device, for example a PIC18, which would provide faster processing (10+ MIPS), a hardware multiplier for signal processing, a faster A/D converter, and C code support, providing more memory and speed.

Root-Mean-Square (RMS) current and voltage measurements may be added to the code to support power and power factor (PF) reporting, allow zero cross detection at non-unity PF, provide fault detection support, measure input cycle frequency, and automatically adjust triac 30 gate drive circuit 70 timeouts.

A daughterboard configuration could be used for controller 90, which would allow the main power board (VCC_PWR) to have 3 oz or 4 oz copper, with associated large trace/space design rules and through-hole construction, while the controller board (VCC_MCU) can be standard 1 oz copper with surface mount device (SMD) components and finer design rules. The controller 90 or main power board (VCC_PWR) could each be re-designed separately and firmware updates could be handled by easy replacement of the module rather than the entire power circuit.

Analog multiplexers 100 (FIGS. 2A, 2B) may be added to select inputs to measure additional analog inputs to controller 90. For example, two 74HC4051 8-1 analog multiplexers may be added, which requires 15 analog inputs. Such may advantageously provide for a simpler layout and fewer connections to a controller daughterboard.

As previously noted, a configuration expansion port 55 may be used, as seen in FIG. 1B, wherein an extra relay K6 and/or triac Q6 on one end of the diode bridge string allows for the connection of two or more board units to larger coil configuration arrays via a connector J7. An associated controller connection between daughterboards would also be used for control synchronization.

The CCV system 1 may include a first temperature sensor R17 (FIG. 1D) on the power board (VCC_PWR) to monitor temperature of or on the heat exchange structure (e.g., heat sink). The CCV system 1 may include a second temperature sensor R19 (FIG. 2B) on the control board (VCC_MCU) to monitor temperature in the ambient surroundings. Voltages across the temperature sensors R17, R19 represent temperature. These voltages are also multiplexed by analog multiplexers 100, buffered by buffer U7, and converted by an A/D converter within controller 90 (e.g., U101, FIG. 2D).

Power Supply

The VCC system 1 may include a power supply 120 (FIG. 1C) to provide a stable on-board 5V supply, for example from an input voltage of about 8V to 20V. The power supply 120 may, for example, include a peak boost/buck/inverting switching regulator, for instance an MC33063A switching regulator commercially available from Texas Instruments.

Also for example, the power supply may include a 7805 voltage regulator. Current consumption may be less than 0.2 A. A battery-backed power supply (not shown) may be provided on a separate board, which provides a capability to manage temporary low input periods without configuration restart, is self powered from generator output, and if +24V, is nominal for industrial controller standards compatibility. Another suitable power supply could be one that accepts a +24 VDC nominal input and provides a +5 VDC 0.25 A output, which is an industrial controller standard that provides +40V input voltage range.

RS485 Serial Interface

Figure 2A:
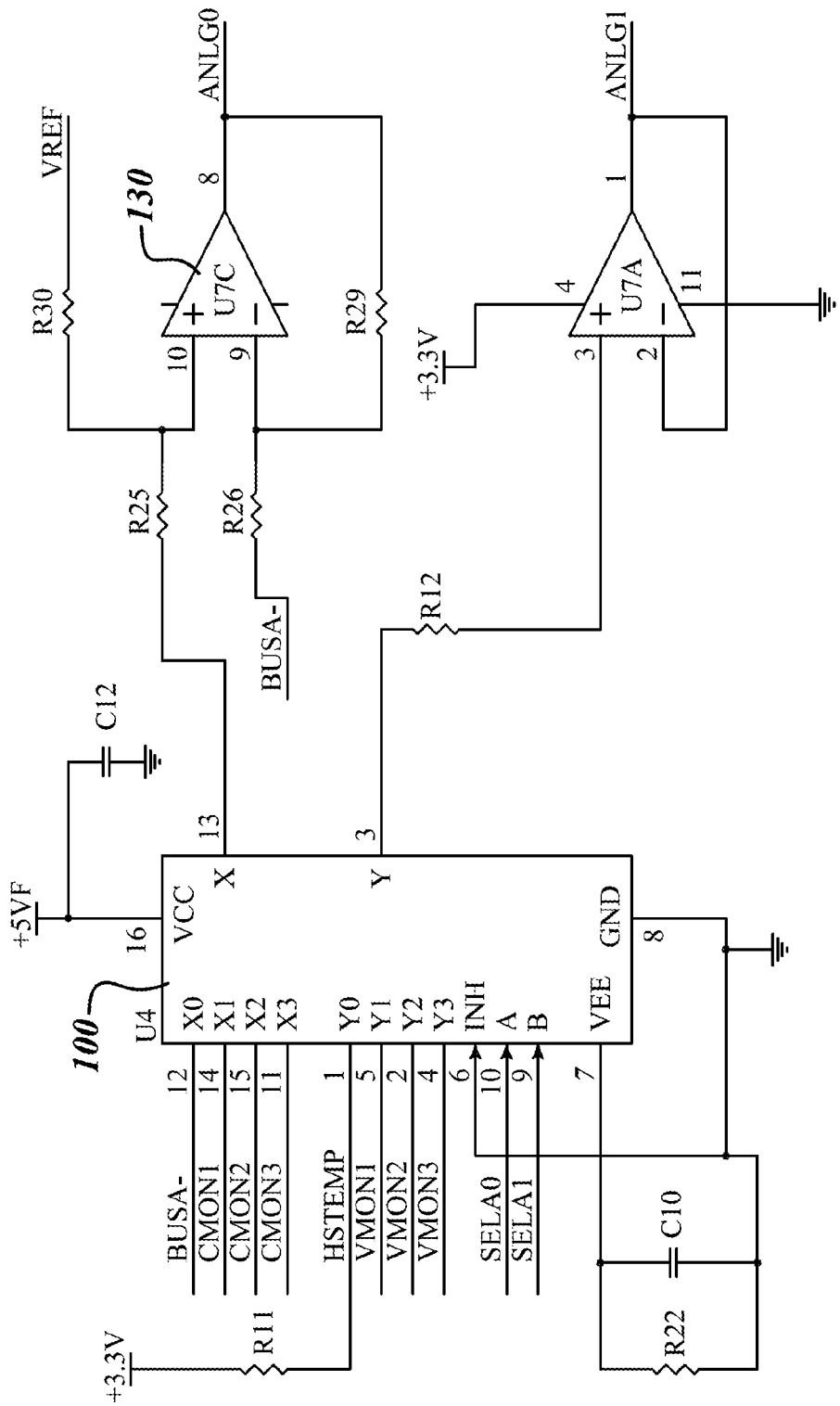
FIG. 2A-2F are a schematic circuit diagram showing a partial representation of control circuit for a variable configuration controller system according to another illustrated embodiment.
Figure 2B:
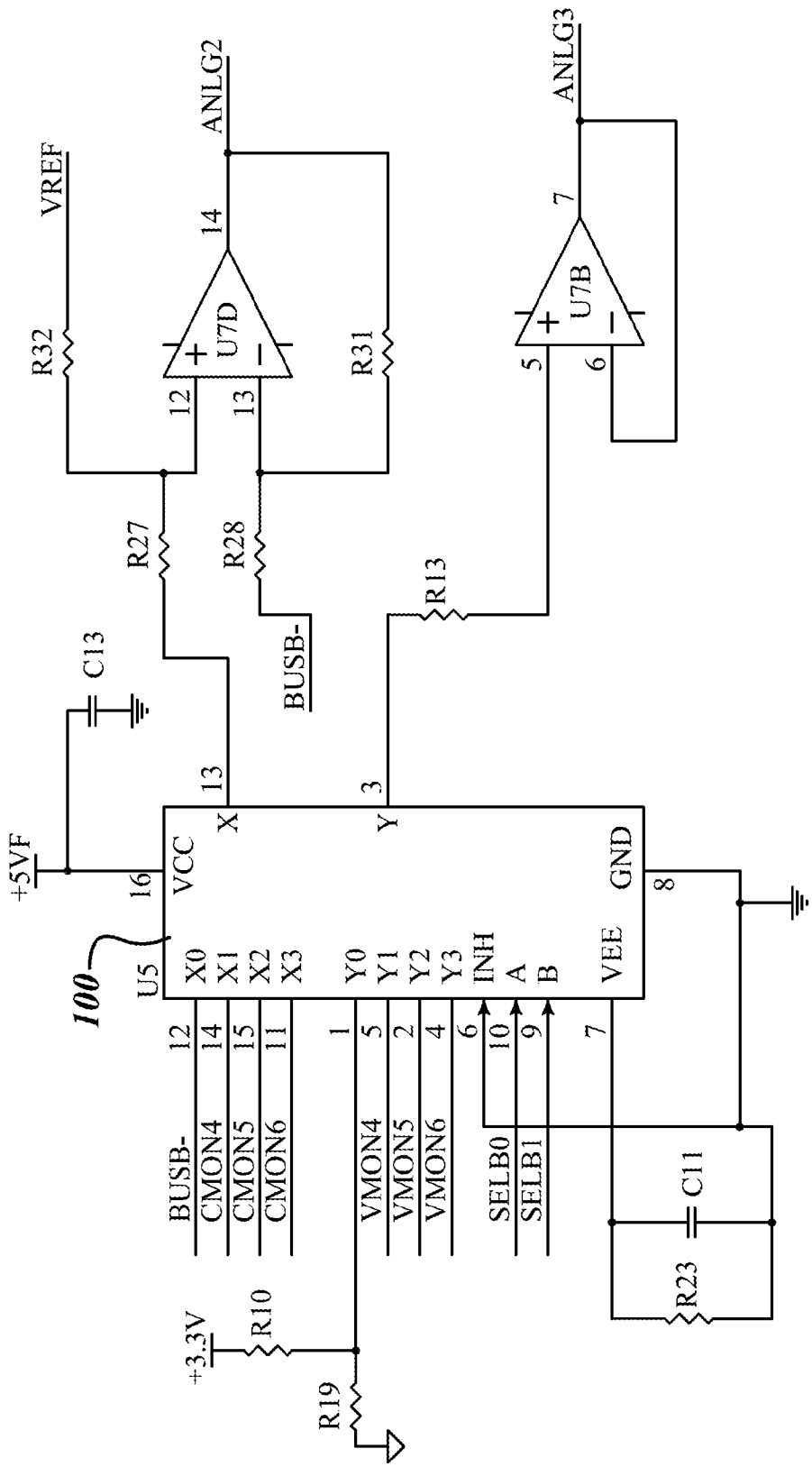
Figure 2C:
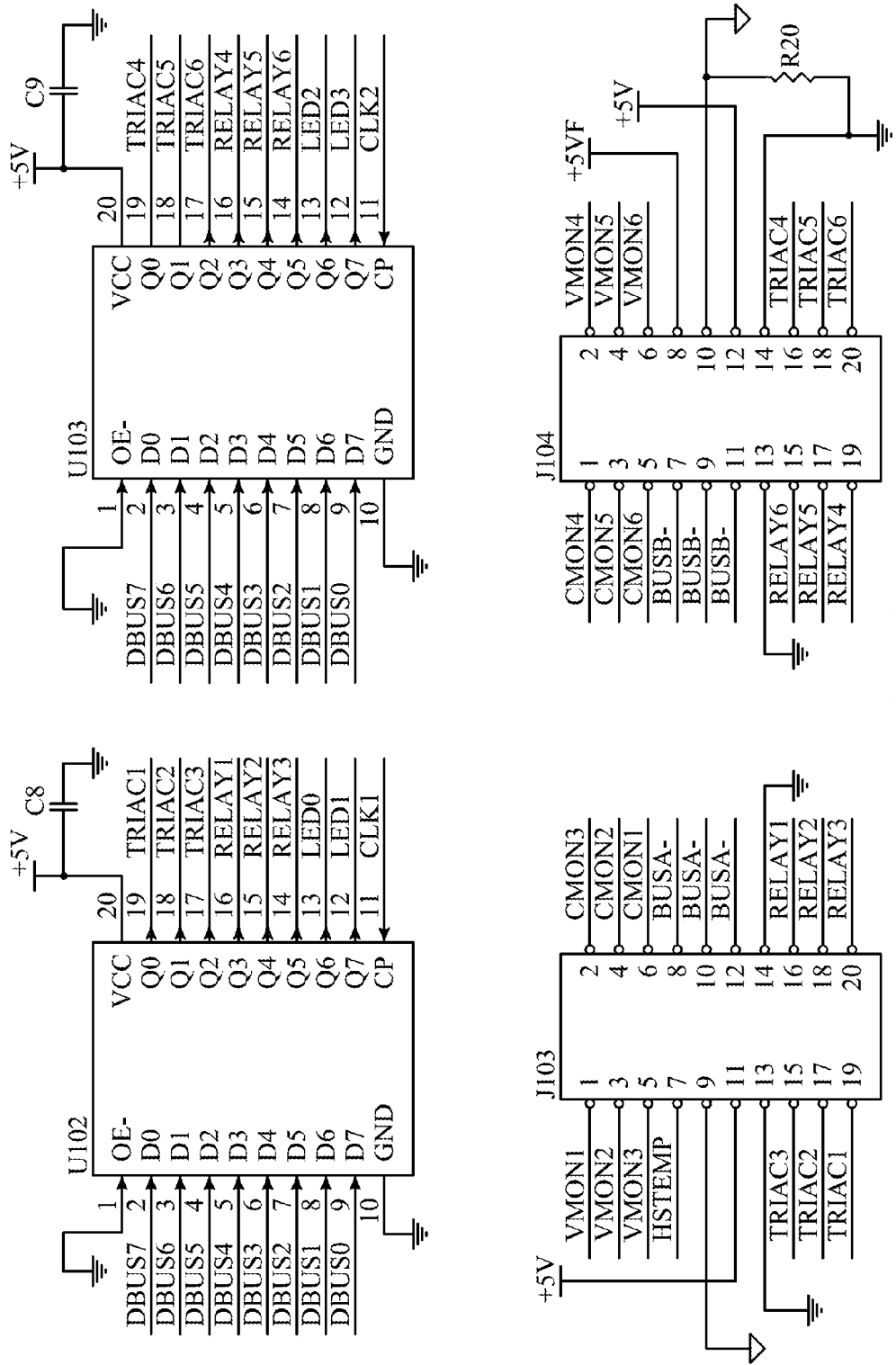
Figure 2D:
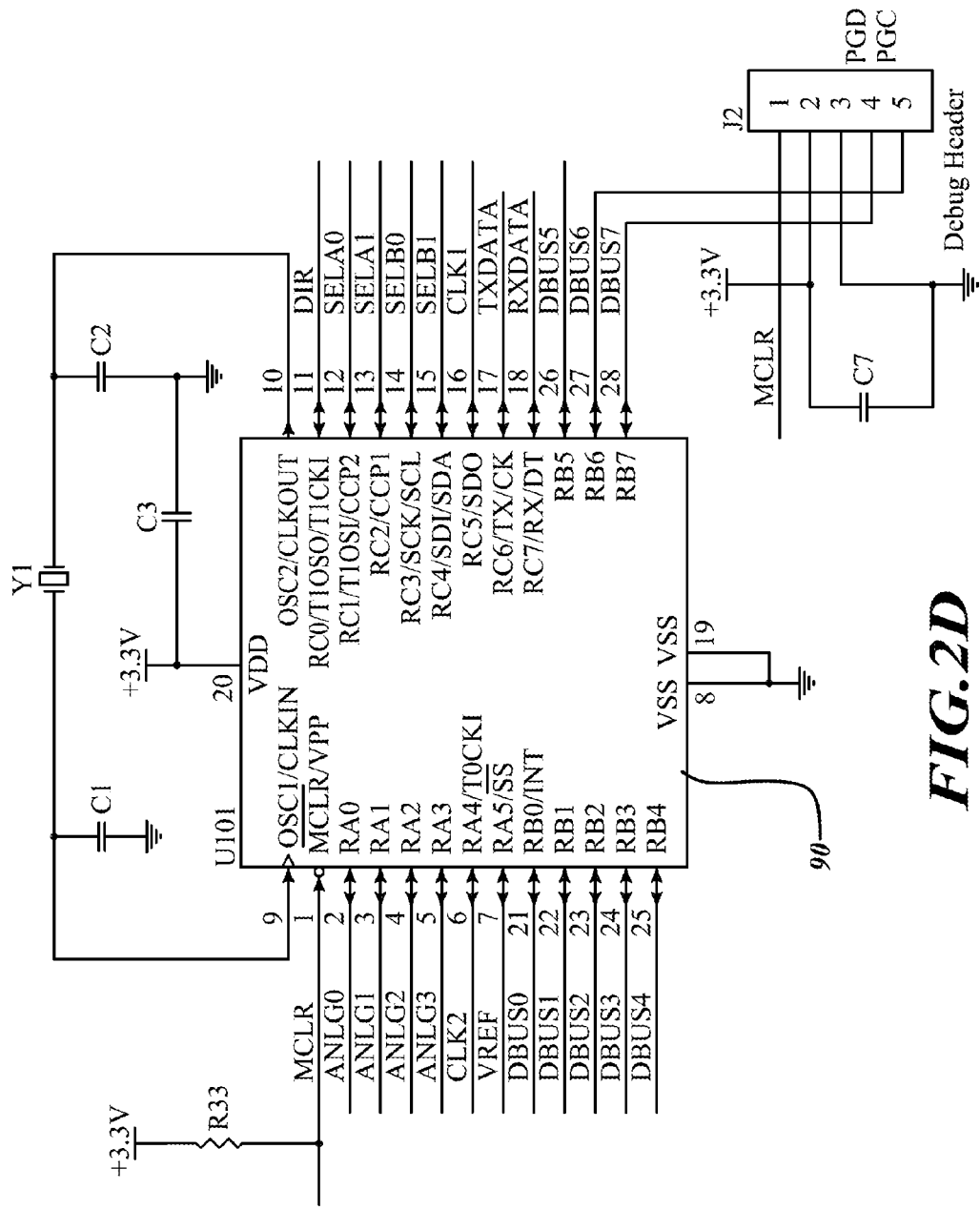
Figure 2E:
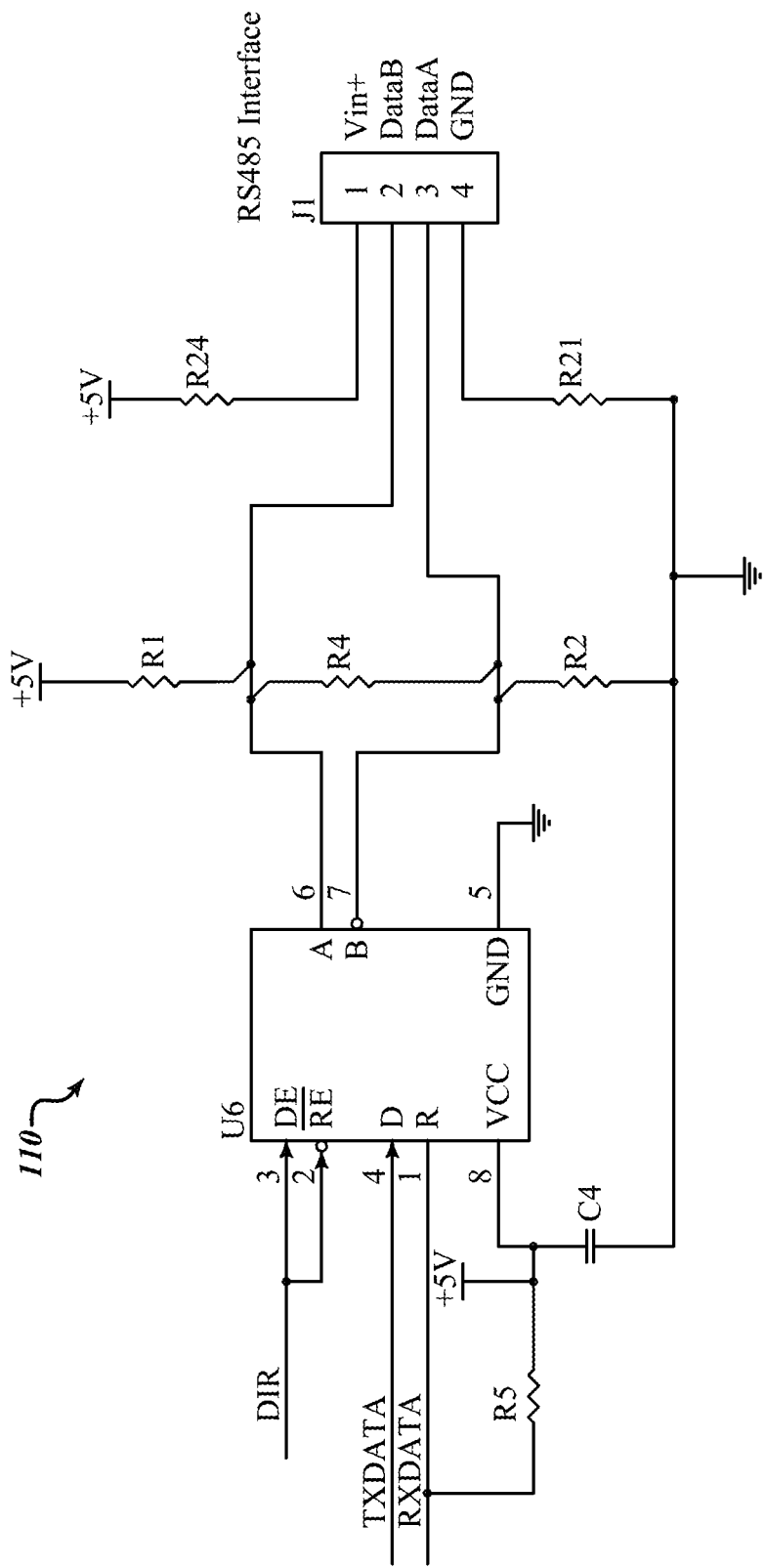
Figure 2F:
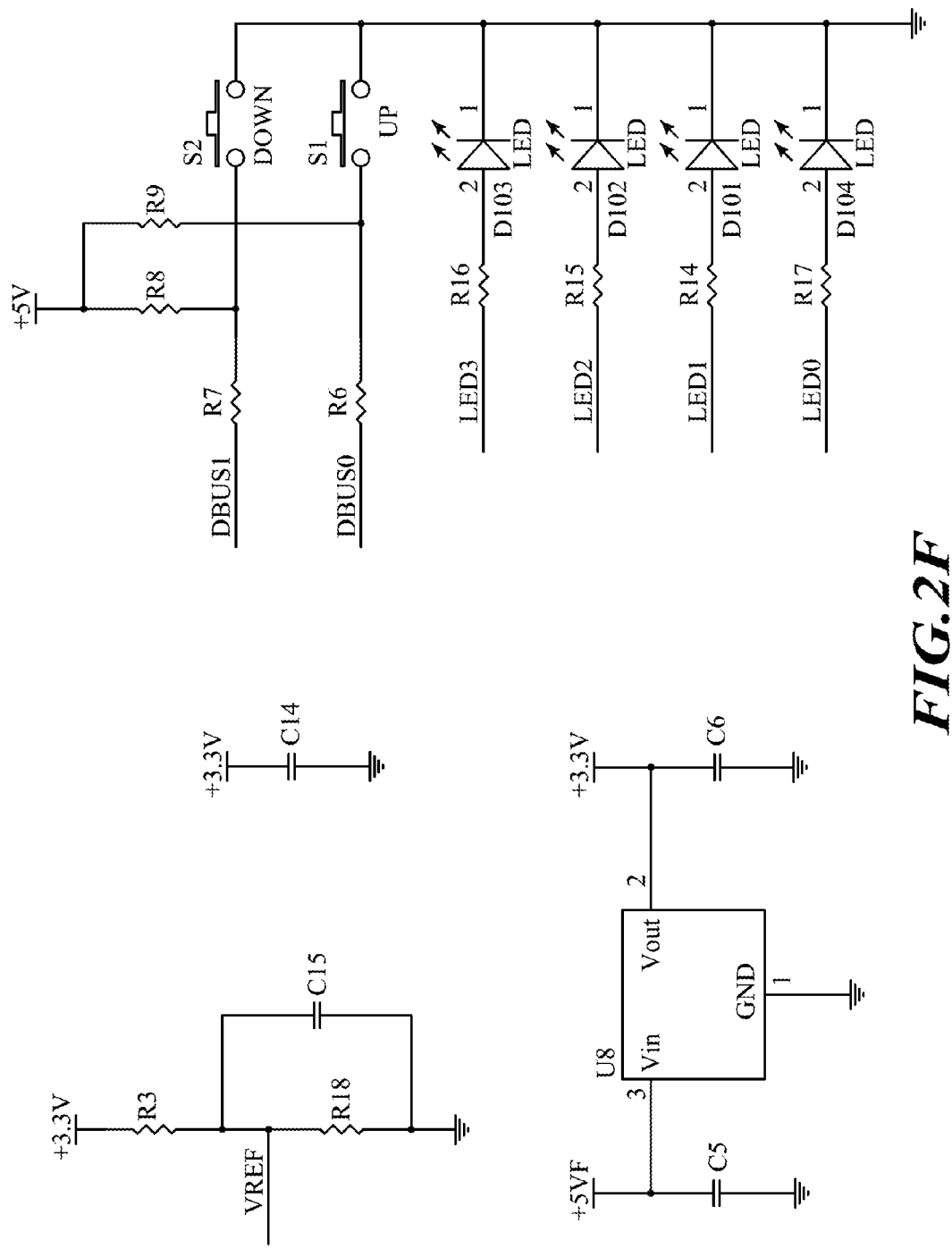

The VCC system 1 may include an RS485 serial interface 110 (FIG. 2E). RS485 serial interface 110 may be a common, standard, industrial control bus used for digital control of coil configuration as well as status reporting from the VCC system 1. RS485 serial interface 110 provides some noise immunity, which is useful to address ground noise issues which may be common in high power installations. The serial format used may be the common 9600 baud, 8 bit, 1 stop bit, no parity. Firmware may be updated via serial interface U6.

Method

Figure 5:
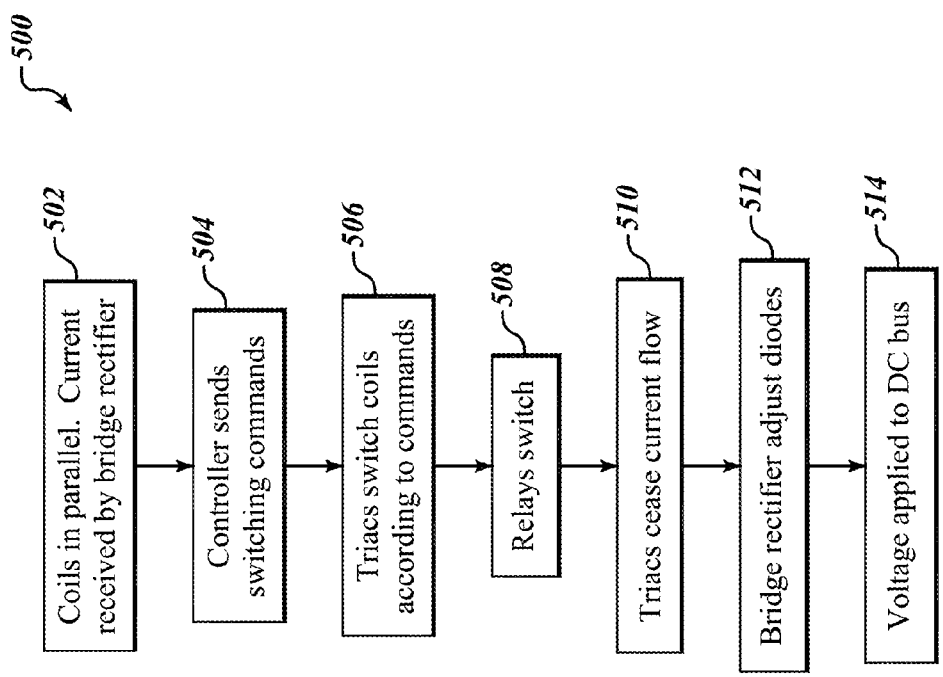
FIG. 5 is a flow diagram showing a method of operating a variable configuration controller system to accomplish series/parallel switching and rectification, according to one illustrated embodiment.

FIG. 5 shows method 500 of operation of the VCC system 1, according to one illustrated embodiment.

At 502, the VCC 1 system typically starts with the coils in a default parallel pattern, arrangement or configuration. Current is generated as output from the coils to the bridge rectifiers 10.

At 504, the controller 90 sends switching commands to triacs 30 and/or relays 50. At 506, triacs 30 (e.g., Q1-Q5) are placed in appropriate states (e.g., ON, OFF) to arrange coils in a desired or commanded series/parallel arrangement. As noted previously, the triacs are relatively faster at switching than relays, but are associated with higher losses. Thus, at 508, the controller 90 causes the relays 50 (e.g., K1-K5) to change states after the triacs 30 have taken up the load. Thus, the triacs 30 cease carrying current flow at 510.

Optionally, bridge rectifiers 10 adjust diodes to isolate current at 512. As previously noted, bridge rectifiers 10 may isolate coils on occurrence of various conditions such as an open circuit, low voltage or electrical short conditions.

At 514, series voltage switches through diodes and the coil voltage is applied to the DC bus as a series combination of voltages.

Other Features

Alternatively, a VCC system 1 may retain the single-phase circuit configuration, with a three-phase implementation created with three separate circuits. This has various advantages, including simplifying the individual phase circuits, providing the required phase isolation, easing construction of the combined circuit, and also allowing polyphase implementations.

A coil step control may be included for overvoltage protection. This may have a manual or automatic control to prevent overvoltage output and protect the circuit elements. A voltage output monitor may be present for fault detection.

The VCC system 1 provides redundancy, in that if a coil fails (either short or open), the action of the associated bridge rectifier 10 is to isolate that coil from the rest of the circuit, while the rest of the circuit operates normally. Note that any coils connected in series modes with the failed coil will also be isolated in such a case, but will re-connect to the circuit if the VCC system 1 disconnects those coils from the failed coil (as long as the re-connection is of equivalent series connection level to the rest of the coils).

Manufacturing Process for a Multi-Stage Generator

As a means to alleviate the manufacturing complexity of a multi-stage generator, wherein each induction element is connected to a VCC system 1, a methodology for containing the wiring outputs of each stack independently may be used. As shown in FIG. 4, this design has all wires from each stack treated independently such that there is a dedicated VCC system 1a (only one identified by broken line and called out in FIG. 4) for each stator, or stator pair (that may be employed when a double sided stator is used). The wiring from each stack that is directed to the VCC system 1a will be managed by respective controller 90. The output of each VCC unit (each stack) is then rectified to a single DC output such that only a common DC bus BUS−, BUS+ is required for connecting a multitude of independent machine stacks. This common DC bus BUS−, BUS+ may significantly reduce the need for tracking the wiring coming from each stack of the generator, may reduce the labor requirements in manufacture, may reduce the wiring cost (as less wire is needed), and may reduce the electrical losses that would otherwise result should that additional wire be used.

In addition, this manufacturing methodology lends itself well to a modular construction that allows easy customization for various generator designs. For example, a generator design might have a rated output of 500 kW for each independent stator. For a two stator stack electric machine, it would be a one megawatt machine design, for a four stack machine, a 2 MW machine design and so on, so that independent single stacks can be mated together easily and connected to a common DC bus. This modular design may allow a single set of components, required for a single stack, to be employed in such a way as to make a multitude of different sized machines, thereby reducing manufacturing costs.

The sharing of load between stacks and VCC systems 1a as described above requires consideration of whether or not a PFC is present. If no PFC is present, coil current sharing depends on:

a) Aligning generator phases (i.e., AC waveforms synchronized, mechanically aligned in the machine). The phases may be purposefully offset, but then there is phase switching due to rectifier action rather than current sharing between coils.

(b) Matching coil phase winding resistances. This is obtained by equal size, same type (wire alloy), equal temperature, and equal length, of winding wire. Note that the length of wire may be minimized by positioning the VCC system at the generator housing making it easier to manage equal length wiring.

(c) Using switching and rectifier elements within the VCC system that are matched types and that are maintained at the same temperature. Consistency in temperature may be obtained by using a common heat sink within the VCC system for the power components.

(d) Using the same length and gauge of wiring from each VCC DC output connected to a common bus via a common connecting point.

If a PFC circuit is present, coil current sharing is more actively controlled by the PFC circuit:

(a) With the stack and VCC system, coil wire, phase, and semiconductor matching are still important as described above. Any stacks connected together before a common PFC circuit will generally require these same matching items for equal current sharing.

(b) The PFC circuit actively controls the current drawn from each stack, and so may enforce sharing between multiple generator connections when multiple PFC circuits are used. Each PFC circuit controls the current level from the total of the units connected to it. The outputs of multiple PFC circuits may then be connected to a single DC output bus.

(c) The sharing of current from multiple PFC circuits connected to a common bus depends upon those PFC circuits having a 'resistive style' output impedance and a controlled, accurate output voltage set point. The value of the resistive nature of the PFC circuit's output is chosen to manage voltage output differences, connection resistance variation, and ensure accurate PFC circuit output bus sharing. The resistance choice is a trade off between sharing level, losses, and bus voltage stability. Equal wire gauge and length from each PFC circuit output to a common bus point will enhance sharing and reduce the PFC circuit's resistance requirement.

"Motor Mode" Operation

Alternatively, a "motor mode" operation for the generator may be employed to obviate the need for a clutch. This circuit can operate by applying voltage from the bus 'output' to one or more of the coils of the electric machine to run the electric machine it as a motor instead of as a generator. This operation 'spins up' (using active stages) the unloaded stages in a multi-stack electric machine from the DC bus power, but also may be used in other applications. For example, such may be used in electric vehicles where the primary mode of the electric machine is as a motor, but the electric machine also operates in a 'regenerative braking' generator mode. Such fits well with a VCC system configured with switches on all bridge rectifiers. When a new stage begins, with low energy production, the new stage is isolated from the bus by bridge rectifiers 10.

Also the output voltage may be returned to AC from the rectified DC. Switches (triac 30, solid state relays 50, or other switches fast enough and with AC capability) can be used as a bridge to reverse the output connections on alternate cycles of the rectified DC waveform, switching at zero voltage points. The output AC waveform will have a small 'zero-cross dead-zone distortion' due to voltage drops in the bridge rectifiers 10 and DC to AC switch bridge, but the waveform would be suitable for connection to a transformer or motor.

This method is synchronous with the input AC waveform, whereas the 'reversible VCC' configuration for stack spin-up described previously pulse-width modulates (PWM) an AC waveform that is independent of the generator output frequency, as it operates from a relatively constant-voltage filtered DC bus input rather than an unfiltered DC rectified waveform.

VCC Connections

Figure 3:
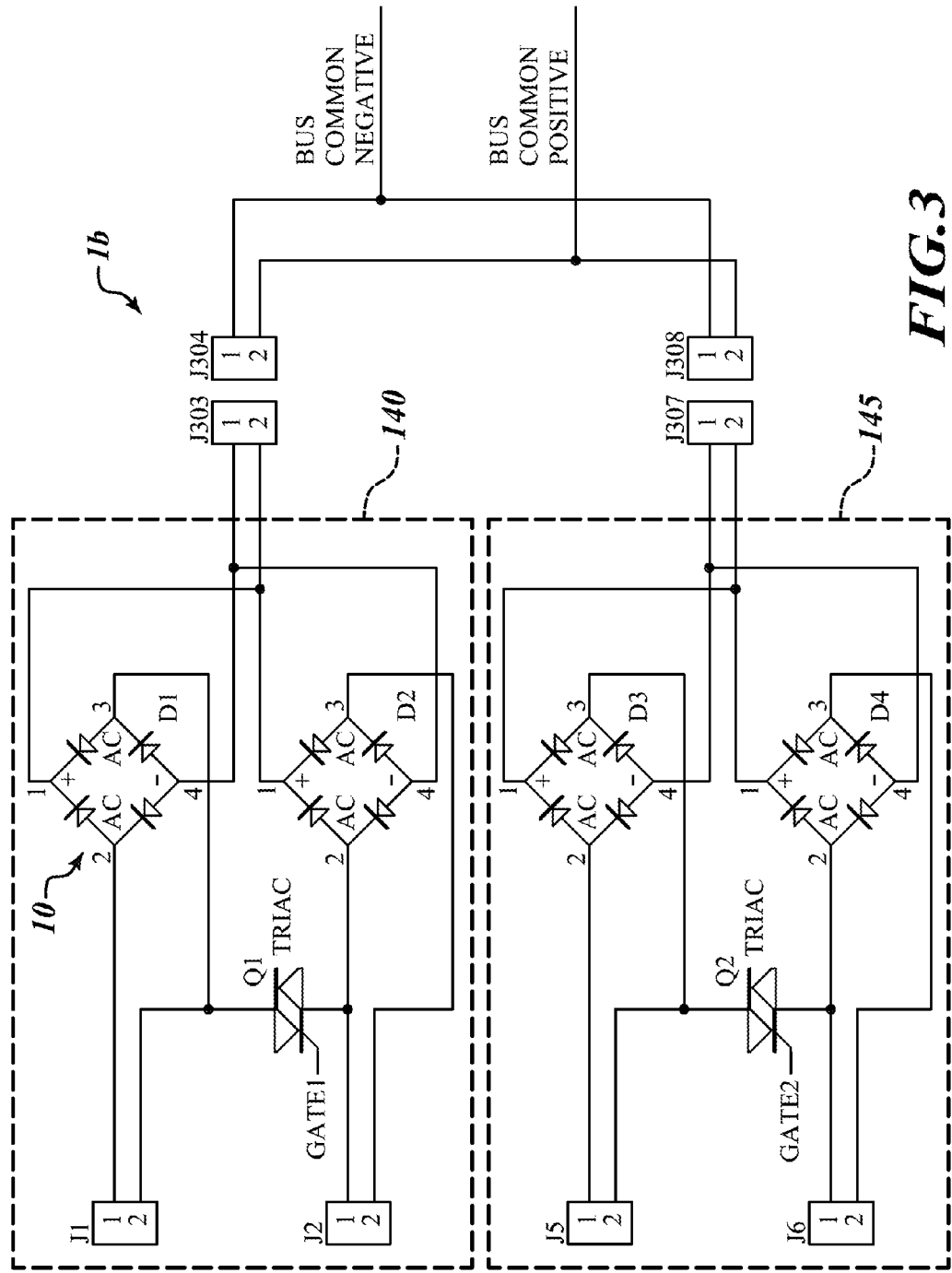
FIG. 3 is a schematic circuit diagram showing two 2-coil variable configuration controller systems configured to output to a common load, according to one illustrated embodiment.

FIG. 3 shows two 2-coil electric machines (e.g., generators, motors) linked to a common bus using respective VCC systems 140, 145. This arrangement can be expanded to a number of coils on each VCC system 140, 145, and a number of VCC units connected to the common bus output point.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to control systems for electric machines, not necessarily the exemplary variable coil configuration systems, methods, and apparatus generally described above.

The various embodiments described above can be combined to provide further embodiments. All of the US patents, US patent application publications, US patent applications, foreign patents, foreign patent applications and non-patent publications referred to in this specification and/or listed in the Application Data Sheet, including but not limited to U.S. patent application Ser. No. 13/393,749, filed May 15, 2012; U.S. Pat. No. 7,081,696; U.S. Patent Application Publication No. 2008088200; U.S. Provisional Patent Application No. 60/094,007, filed Sep. 3, 2008, and U.S. Provisional Patent Application Ser. No. 61/239,769, filed Sep. 3, 2009, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A variable coil configuration system, comprising:
a plurality of bridge rectifiers, the bridge rectifiers each having a pair of AC nodes on an AC side of the respective bridge rectifier and a pair of DC nodes on a DC side of the respective bridge rectifier, wherein the pair of AC nodes for each bridge rectifier in the plurality of bridge rectifiers is electrically connectable to a coil of an electric machine;
a first number of switches, each of the switches of the first number of switches on the AC side of a respective one of the bridge rectifiers, wherein each switch in the first number of switches is electrically connectable between two coils in the electric machine such that, in operation, for each of the switches electrically connected between two coils in the electric machine, the bridge rectifiers couple the two coils electrically in parallel with one another when the switch is open and the two coils are not subject to an open circuit condition, a low voltage condition or a short circuit condition, and the switch selectively electrically couples the two coils in series with one another when the switch is closed; and
a second number of switches, each of the switches of the second number of switches electrically connected in parallel with respective ones of the first number of switches, wherein the switches of the first number of switches are faster acting than the switches of the second number of switches and the switches of the second number of switches have a lower associated electrical loss than an electrical loss associated with the switches of the first number of switches.

2. The variable coil configuration system of claim 1 wherein the bridge rectifiers automatically electrically isolate a respective one of the coils of the electric machine from a parallel combination with at least one other one of the coils of the electric machine when the respective one of the coils experiences either a short circuit condition, a low voltage condition or an open-circuit condition.

3. The variable coil configuration system of claim 2 wherein the bridge rectifiers automatically electrically couple the respective one of the coils of the electric machine in series with at least one other one of the coils of the electric machine when the respective one of the coils experiences either the short circuit condition, the low voltage condition or the open-circuit condition.

4. The variable coil configuration system of claim 1 wherein the first number of switches are semiconductor based switches.

5. The variable coil configuration system of claim 4 wherein the first number of switches are TRIACS.

6. The variable coil configuration system of claim 5, further comprising:
a controller configured to switch the TRIACS at a respective zero crossings of a respective current.

7. The variable coil configuration system of claim 1 wherein the second number of switches are mechanical switches.

8. The variable coil configuration system of claim 1 wherein the first number of switches are mechanical switches.

9. The variable coil configuration system of claim 1 wherein all of the bridge rectifiers of the plurality of bridge rectifiers are coupled to a common heat sink.

10. The variable coil configuration system of claim 1, further comprising:
a power factor correction circuit applying a power factor correction at a DC output of the variable coil configuration system.

11. The variable coil configuration system of claim 1 wherein a number of active switches are selectively operable to reverse a current flow from a DC bus to the coils to operate the electric machine as a motor.

12. The variable coil configuration system of claim 1, further comprising:
an additional bridge rectifier coupled to an end of a string formed by the bridge rectifiers of the first number of bridge rectifiers to couple the variable coil configuration electrically in parallel with a second variable coil configuration system;
at least one additional switch operable to selectively couple the variable coil configuration electrically in series with the second variable coil configuration system; and
a coupler configured to detachably electrically couple the second variable coil configuration system to the variable coil configuration system.

13. A method of operating a variable coil configuration system that comprises a plurality of bridge rectifiers, the bridge rectifiers each having a pair of AC nodes on an AC side of the respective bridge rectifier and a pair of DC nodes on a DC side of the respective bridge rectifier and a first number of switches, each of the switches of the first number of switches a semiconductor based switch on the AC side of a respective one of the bridge rectifiers,
wherein each of the switches in the first number of switches is electrically connectable to at least two coils of an electric machine, the variable coil configuration system further comprising a second number of switches, each of the switches of the second number of switches electrically connected in parallel with a respective one of the switches of the first number of switches, wherein the switches of the first number of switches are faster acting than the switches of the second number of switches and the switches of the second number of switches have a lower associated electrical loss than an electrical loss associated with the switches of the first number of switches, the method comprising:

electrically coupling at least two coils of the electric machine in parallel with one another via a respective one of the bridge rectifiers when the switch connected to the at least two coils of the electric machine is open and wherein the two coils are not subject to an open circuit condition, a low voltage condition or a short circuit condition, electrically coupling the at least two coils of the electric machine in series with one another when the switch connected to the at least two coils of the electric machine is closed; and for the coils of the electric machine that are electrically coupled in series with one another by the respective switch of the first number of switches, further coupling the coils of the electric machine electrically in series with one another by a respective one of the switches of the second number of switches concurrently with or immediately following the coupling electrically in series of the coils by the respective switch of the first number of switches.

14. The method of claim 13 wherein selectively coupling at least two coils of the electric machine electrically in parallel with one another via a respective one of the bridge rectifiers includes selectively coupling a first two coils electrically in parallel with one another at a first time and wherein selectively coupling at least one pair of coils of the electric machine electrically in series with one another via a respective one of the first number of switches includes selectively coupling the first two coils electrically in series with one another at a second time, different from the first time.

15. The method of claim 13 wherein selectively coupling at least two coils of the electric machine electrically in parallel with one another via a respective one of the bridge rectifiers includes selectively coupling a first two coils electrically in parallel with one another at a first time and wherein selectively coupling at least one pair of coils of the electric machine electrically in series with one another via a respective one of the first number of switches includes selectively coupling a second two coils, different from the first two coils, electrically in series with one another during the first time.

16. The method of claim 13, further comprising:
switching a state of the switches of the first number of switches by a controller at a respective zero crossings of a respective current.

17. The method of claim 13, further comprising:
automatically electrically isolating a respective one of the coils of the electric machine from a parallel combination with at least one other one of the coils of the electric machine by a respective one of the bridge rectifiers when the respective one of the coils experiences either a short circuit condition, a low voltage condition or an open-circuit condition.

18. The method of claim 17, further comprising:
automatically electrically coupling the respective one of the coils of the electric machine in series with at least one other one of the coils of the electric machine when the respective one of the coils experiences either the short circuit condition, the low voltage condition or the open-circuit condition.

19. The method of claim 13, further comprising:
correcting a power factor of a current at a DC output of the variable coil configuration system.

20. The method of claim 13, further comprising:
selectively reversing a current flow from a DC bus to the coils to operate the electric machine as a motor.

21. The method of claim 13, further comprising:
detachably electrically coupling a second variable coil configuration system to the variable coil configuration system.

22. The method of claim 13 wherein selectively coupling at least two coils of the electric machine electrically in series with one another via a respective one of the first number of switches includes selectively coupling at least two coils of the electric machine electrically in series with one another via a triac, an insulated gate bipolar transistor, a field effect transistor or a solid state relay.

* * * * *